United States Patent Office 3,756,974
Patented Sept. 4, 1973

3,756,974
LATEX COMPOSITION
Wayne J. Buchheim and Wilford D. Bonds, Chattanooga, Tenn., assignors to GAF Corporation, New York, N.Y.
No Drawing. Filed Aug. 27, 1971, Ser. No. 175,760
Int. Cl. C08d 7/18
U.S. Cl. 260—29.7        10 Claims

ABSTRACT OF THE DISCLOSURE

A latex prepared by emulsion co-polymerization of a monomer mixture containing an aliphatic conjugated diene, a monoalkenyl aromatic monomer, an unsaturated aliphatic carboxylic acid and as surfactant a poly (N-vinyl lactam).

BACKGROUND OF THE INVENTION

This invention relates to novel copolymers of a monoalkenyl aromatic monomer, an open chain aliphatic conjugated diene and one or more unsaturated aliphatic carboxylic acids including interpolymers with such other monomers as acrylates, acrylonitrile, and like monomers. More particularly the invention relates to a stable aqueous emulsion containing such copolymers and interpolymers and to a use for same. Still more particularly the invention relates to low to medium molecular weight poly (N-vinyl lactams) as surfactants in the preparation of carboxylated interpolymer latices of a monoalkenyl aromatic monomer and an aliphatic conjugated diene.

It is believed that the poly (N-vinyl lactams) are synergistic with the surfactant system and operate as a co-stabilizer or co-surfactant in conjunction therewith. It is not believed that there occurs any significant grafting onto the poly (N-vinyl lactam). It has been found that a novel effect on small particle size is obtained in accordance with this invention when the poly (N-vinyl lactam) is included in small amounts so as to be operative to enter into micelle formation; a low viscosity emulsion system is thereby formed which contains a high solids count.

SUMMARY OF THE INVENTION

It is one of the objects of the present invention to provide a latex of the aforementioned composition which is stable, has a small particle size and/or other improved properties. Other objects and advantages will appear as the description proceeds.

The use of protective colloids and surfactants in emulsion polymerization is well known in the art. However, the synergistic effect of a poly (V-vinyl lactam) in the preparation of carboxylated-monoalkenyl aromatic-aliphatic conjugated diene latexes is unexpected. Broadly speaking, the aqueous emulsion of the present invention produces a latex having suprisingly improved properties, small particle size, excellent water resistance and high surface tension at low viscosity. The latex exihibits a fast drying rate, a low thickener requirement, good filter wet-out, substantial resistance to blistering and most significantly the ability to be concentrated at 60 to 65% solids, yet with workable viscosities. Furthermore, the dye receptivity of the latex is significantly improved in spite of the low to medium molecular weight of the lactam.

Novel interpolymers of this invention can be compounded with a wide variety of additives such as pigments, clays, salts, protective colloids, wetting agents, plasticizers, resins, waxes, etc. in order to obtain a wide range of products for use in all field in which emulsion polymers are now used. More particularly, the latex may be used in textile coatings, paints, adhesives, paper coating and the like.

The attainment of the above objects is made possible by this invention which includes the provisions of preparing a latex by emulsion co-polymerization in an aqueous acidic medium of a mixture of monomers comprising an aliphatic conjugated diene, a monoalkenyl aromatic monomer, and at least one unsaturated aliphatic carboxylic acid in the presence of a free radical supplying catalyst and as surfactant a poly (N-vinyl lactam).

It should be understood that the polymeric N-vinyl lactam does not serve as either a monomer or a substrate, but rather, is believed to act as a surfactant. Because of the foregoing, the instant latex has particularly good properties for use as a tire cord adhesive in laminating tire cord to rubber, as an adhesive in laminating jute to carpet back and in other areas where difficult laminations are encountered. The instant latex also has outstanding properties as an adhesive paste for such laminations.

As examples of N-vinyl lactams which may be employed in producing the operative aqueous solutions of water soluble polymers thereof, there may be mentioned the N-vinyl derivatives of gamma-, delta-, and epsilon-lactams (N-vinyl derivatives of the cyclic amides of gamma-, delta-, and epsilon-aminocarboxylic acids of the aliphatic series) and lower alkyl (methyl, ethyl) substituted derivatives of such N-vinyl lactams. Among this group, N-vinyl-2-pyrrolidone, otherwise referred to as 1-vinyl-2-pyrrolidone, N-vinyl-α-pyrrolidone, is preferred. As illustrative of other N-vinyl lactams within this group, there may be mentioned N-vinyl-2-piperidone, N-vinyl-6-caprolactam, N-vinyl-methyl-2-pyrrolidone, N-vinyl-3,3-diethyl-2-pyrrolidone, and the like. Other N-vinyl lactams which may be employed include N-vinyl-hexahydrophthalamide, N-vinyl-naphthostyrile, etc. Depending upon the extent of polymerization, these polymeric N-vinyl lactams may have molecular weights ranging from at least 400 up to 2,000,000 or more.

The Fikentscher K value as described, for example, by Schildknect in "Vinyl and Related Polymers," John Wiley & Sons, Inc., New York, 1952 (page 676), is a convenient designation of relative degrees of polymerization or relative molecular weights. Generally, they may be employed with those polymeric N-vinyl lactams having a K value of about 14 to 30, and preferably about 14 to 26 and optimally about 15.

The monomeric materials which are useful in the present invention comprise a monoalkenyl aromatic monomer, an open chain aliphatic conjugated diene, and at least one unsaturated aliphatic mono-, or poly-carboxylic acid. By the term "monoalkenyl aromatic monomer" it is intended to include those monomers wherein an alkenyl group is attached directly to an aromatic nucleus containing about 6 to about 10 carbon atoms. These monomers may include alkyl, alkoxy and/or halo substituted compounds. Typical of these monomers are styrene, p-methylstyrene, o-methylstyrene, o-p-dimethyl styrene, α and β-bromovinyl benzene, α and β-chlorovinyl benzene, o-, m-, or p-methoxy-vinyl benzene, o-p-diethyl styrene, p-chlorostyrene, isopropyl styrene, tert-butyl styrene, o-methyl-p-isopropyl styrene, o-chloro-p-methylstyrene, and o-p-dichlorostyrene and the like, and any mixtures thereof. Vinyl naphthalenes may also be used either alone, mixtures thereof or in combination with the styrene monomers. Because of its availability and ability to produce desirable polymers and for other reasons, it is preferred to use styrene as the monoalkenyl aromatic monomer.

By the term "open chain-aliphatic conjugated diene" it is meant to include typically butadiene-1,3; 2-methyl-butadiene-1,3; 2,3-dimethyl butadiene-1,3; piperylene; 2- neopentylbutadiene-1,3; and other homologs of butadiene-1,3 and in addition, the substituted dienes, such as 2-chlorobutadiene-1,3; 2-cyano-butadiene-1,3; the substituted straight chain conjugated pentadienes, the straight-and-branch-chain hexadienes, and others. The butadiene-1,3 hydrocarbons because of their ability to produce particularly desirable polymeric materials, are preferred comonomers for use with the monoalkenyl aromatic monomer.

The unsaturated aliphatic carboxylic acids include any of those copolymerizable with the aforementioned monomers, such as monoethylenically unsaturated mono and poly carboxylic acids. Combinations of two or more such acids are equally operable in this invention. The unsaturated aliphatic carboxylic acid may be added in its free acid form or in a partially neutralized form, or may be converted, at least in part, to a salt while in an aqueous dispersion. As exemplary of olefinically unsaturated mono-carboxylic acids, there may be mentioned, crotonic acid, α-chlorocrotonic acid, iso-crotonic, cis-2-butenoic acid, hydrosorbic acid, acrylic acid, α-chloroacrylic acid, methacrylic acid, ethacrylic acid, vinyl thiophenic acid, α-furylacrylic acid, vinyl furoic acid, sorbic acid, α-methyl sorbic acid, α-ethyl sorbic acid, α-chloro sorbic acid, α-bromo sorbic acid, β-chloro sorbic acid, α-β-gamma-epsilon-dimethyl sorbic acid and the like.

It is advantageous to utilize one or more olefinically unsaturated polycarboxylic acids, containing an activated olefinic double bond which readily functions in an addition polymerization reaction because it is present in the monomer molecule either in the α-β position with respect to a strongly polar or functional group, such as carboxyl or others which are well known as activating groups, or because it is adjacent to a terminal methylene group, $CH_2=C<$.

In general, the typically suitable polycarboxylic acids may be represented by the following formula:

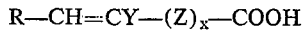

in which R is preferably hydrogen or carboxyl, but may be carboxylic ester, alkyl or alkenyl, Y is hydrogen, carboxyl, halogen, cyano, sulfo, alkyl, aryl, thienyl or furyl, Z is a methylene or a substituted methylene group, or an allyl, arylene, thienylene or furylene divalent radical, $x$ is zero or any whole number, suitably not exceeding 3 and in which at least one of the groups R and Y is carboxyl, or Z is carboxyl-containing.

For example, such olefinically unsaturated polycarboxylic acids include fumaric, maleic, citraconic, mesaconic, itaconic, teraconic, aconitic, ethyl maleic acid, methyl itaconic, muconic, hydromuconic, glutaconic, 3-carboxypentadiene-(2,4)-oic-1, β-(p-carboxyphenyl) acrylic, the dimer and trimer of methacrylic acid and other mono-olefinic and polyolefinic polycarboxylic acids. The utilization of these copolymerizable polybasic acids or their anhydrides which are readily hydrolyzed in the acidic polymerization provides a means for direct introduction of the polycarboxylic acid groups into the polymer chain.

By the term "non-carboxylated monoalkenyl aliphatic monomer" it is meant to include the vinyl esters such as vinyl bromide, vinyl fluoride, vinyl acetate, vinyl chloroacetate, vinyl butyrate, other fatty acid vinyl esters, vinyl alkyl sulfonates, trichloro-ethylene and the like; vinyl ethers such as vinyl ethyl ether, vinyl isopropyl ether, vinyl chloroethyl ether and the like; acrylics such ethyl acrylate, ethyl chloroacrylate, diethyl maleate, diethyl fumarate and the like; vinylidene chloride, vinylidene bromide, vinylidene fluorochloride and the like. As examples of such acrylate esters the following are illustrative: methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-methyl-2-pentyl, hexyl, 2-ethylhexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate; methacrylic monomers such as methyl methacrylate, ethyl methacrylate, isobutyl methacrylate, isoamyl methacrylate, β-methoxy ethyl methacrylate and α-(chlorophenyl) ethyl methacrylate, 2-nitro-2-methyl propyl methacrylate, diethylaminoethyl methacrylate, ethylidene acetate methacrylate and glycidyl methacrylate, including esters of halo acrylic acids, such as methyl-2-chloro-acrylate, ethyl α-chloro-acrylate, methacrylonitrile, acrylonitrile; N-alkyl and N-aryl substituted acrylamides such as N-methyl acrylamide, N-ethyl acrylamide, N-propyl acrylamide, N-n-butyl acrylamide, N-n-dodecyl acrylamide, N-n-octadecyl acrylamide, N,N-dimethyl acrylamide, N,N-diethyl acrylamide, N,N-di-n-butyl acrylamide, N,N-di-isobutyl acrylamide, and grafted monomers of the type disclosed in U.S. Pats. 3,029,219, 3,035,009, 3,036,033 and the like. These monomers should be included in amounts of about 0.2 to about 7.0 parts when employed, and preferably about 0.5 to about 5.0 parts.

The free radical supplying redox polymerization catalysts useful in the present invention are well known in the art. Most of these catalysts are compounds yielding oxygen under the conditions of polymerization but need not be, as represented by the inorganic or organic peroxygen or peroxide compounds. As an example of such compounds, there may be mentioned, hydrogen, peroxide, methyl and alkyl peroxides, such as sodium, potassium, barium and zinc peroxide, diacyl peroxides, such diacetyl, dibenzoyl, dialauroyl peroxide, dialkyl peroxides, such as ditertiary-butyl hydroperoxide and cyclohexene peroxide, hydroperoxides such as tertiary-butyl hydroperoxide and p-methane hydroperoxide, peroxygen acids such as performic, persulfuric, peracetic acid and their ammonium, sodium and potassium salts, in addition to systems such as potassium or ammonium persulfate-sodium bisulfite. Other oxygen yielding compounds or sources include atmospheric oxygen, ozone and the like.

Azo type catalysts, i.e., compounds containing the azo linkage, may be employed. As examples of such catalysts, there may be mentioned α-α′-azobis-(α-γ-dimethyl valeronitrile), α-α′-azobis-(α-methyl butyronitrile), α-α′-azobis(α-ethylbutyronitrile), α-α′-azo-diisobutyramide, dimethyl and diethyl, α-α′-azodiisobutyrate and the like.

The preferred catalyst effective for the production of optimum results with respect to a minimum of homopolymer and maximum emulsion stability and film clarity are the water soluble organic and inorganic peroxygen compounds referred to above, which may be employed along with an activator and the like. Some typical activators are amines, meta-bisulfites, ascorbic acid and erythorbic acid. It is generally accepted in emulsion polymerization technology that agitation is required for the dispersion initially and thereafter to maintain the dispersion throughout the polymerization. The rate of agitation to be used in any particular instance will be dependent primarily on the overall design of the polymerization equipment. A minimum amount of agitation required to form and to maintain the dispersion is usually desired.

DETAILED DESCRIPTION

In carrying out the polymerization reaction, the catalyst and the mixture of open chain aliphatic conjugated diene, monoalkenyly aromatic monomer and unsaturated aliphatic carboxylic acid may in general be admixed with an aqueous solution of polymeric N-vinyl lactam and other surfactants. It bears repeating that the polymeric N-vinyl lactam functions not as a co-monomer but rather as a surfactant. The water insoluble monomers may all be added initially, or separately or all of such monomers may all be added initially, or separately or all of such monomers may be added gradually or in increments to the aqueous portion which contains the acid, catalyst, and polymeric N-vinyl lactam. The aqueous solution of polymeric N-vinyl lactam preferably containing the catalysts, should preferably be present in the polymerization vessel at the start of the reaction.

It is therefore preferred that the water insoluble phase containing the monoalkenyl aromatic monomer, aliphatic conjugated diene and mercaptan be added to the water soluble phase containing the polymeric N-vinyl lactam, unsaturated aliphatic carboxylic acids and catalyst.

After the above steps have been completed, the reaction is commenced and should be carried out at a temperature range of about 50 C. to about 125° C., the preferred range being about 60° C. to about 80° C. The presure should be sufficient to maintain the aliphatic conjugated diene liquid and generally the preferred pressure range is between about 40 and about 130 p.s.i. Where a high content of monoalkenyl aromatic monomer is employed, a low pressure will be needed and conversely, where a high content of aliphatic conjugated diene is employed, a higher pressure will be needed. The temperature range will affect the pressure for any given ratio of aliphatic conjugated diene-monoalkenyl aromatic monomer mixture. As with other polymerization reactions, toward the end of the reaction the pressure drops while the temperature remains constant, the pressure soon thereafter levels out and then likewise remains constant. The pH of the medium is substantially noncritical, though a pH of below 7, preferably about 2–7, and optimally about 3, should be employed in order to prevent coagulation. At the end of the polymerization reaction the pH should if necessary be adjusted upward to at least about 7 by the addition of a base, such as ammonia or the like. Completion of the reaction may be determined by cessation of heat and/or analysis of solids content and the like. A solids content of about 50 to about 60% is preferred through further concentration is permissible. The reaction time is generally about 3 to about 18 hours and should be about 6 to 12 hours. Naturally, the temperature:time ratio will influence the foregoing; by increasing the temperature, less time will be needed and likewise by lowering the temperature, more time will be needed.

The polymerization reaction is substantially quantitative in that a latex is produced containing the carboxylated-aliphatic conjugated diene-monoalkenyl aromatic interpolymer with little or no polymeric product dissolved in the continuous aqueous phase.

The amount of polymeric N-vinyl lactam can be varied from about 0.1% to about 5% by weight, preferably about 0.25% to about 4.0%, and optimally 0.5% to 1.0%. The amount of unsaturated aliphatic carboxylic acid in the monomer mixture can vary from about 0.5 parts to about 10.0 parts, preferably 1–8 parts and optimally, below about 6.0 parts by weight. The relative proportions of monoalkenyl aromatic monomer to aliphatic conjugated diene can vary from about 0:100 to 70:27, preferably about 12:87 to 70:27.

Any of said non-carboxylated monoalkenyl aliphatic monomers such as vinylidene chloride, acrylonitrile, methylmethacrylate, and the like can be substituted in whole or in part for the monoalkenyl aromatic monomer and/or in part for the aliphatic conjugated diene.

The latex produced in accordance with this invention is characterized by unusually good stability, low to medium viscosity, generally below 2500 cps. (centipoises, Brookfield viscosimeter) the ability to deposit a clear transparent film on a glass plate or other substrate, such as those made of metal, paper and the like, and a product which is essentially water insoluble and exhibits good solubility in aromatic solvents. The product may be characterized as a carboxylated-monoalkenyl aromatic-aliphatic conjugated diene copolymer prepared with the aid of a polymeric N-vinyl lactam surfactant.

It will be understood that the instant invention may employ known surface active agents, protective colloids, plasticiers, thickeners, chain transfer agents and other additives which may be added prior to, during or after the polymerization reaction is completed in accordance with techniques well known in the art.

Anionic, nonionic, or cationic emulsifying agents may be employed although anionic agents are preferred. As examples of non-ionic agents which may be employed there may be mentioned the condensation products of a plurality of moles of ethylene oxide, with organic compounds containing at least 8 carbon atoms and a reactive hydrogen atom, such as the water insoluble aliphatic alcohols, alkyl phenols, carboxylic and sulfonic acids and amides, primary and secondary amines, mercaptans, hydroxyalkylamines, as disclosed, for example, in U.S. Pats. 1,970,578 and 2,205,021, 2,085,706, 2,002,613, 2,226,141, 2,677,700, 2,213,477, 2,593,112, 2,454,434, 2,454,542–45 and 2,174,761. As specific examples of nonionic agents there may be mentioned the reaction product of 1 mole of nonylphenol with 9 to 100 E.O. (mole ethylene oxides), 1 mole of castor oil with 20 E.O., 1 mole tall oil with 18 E.O., 1 mole of oleyl alcohol with 20 E.O., 1 mole of dodecyl mercaptan with 90 E.O., 1 mole of soybean oil amine with 10 E.O., 1 mole of rosin amine with 32 E.O., 1 mole of cocoanut fatty acid amine with 7 E.O., 1 mole of dinonyl phenol with 15 E.O., 1 mole of oxo tridecyl alcohol with 12 E.O., Pluronic L–62 and the like.

Suitable anionic surface agents include the sulfonic acid, sulfate esters, phosphate esters and salts thereof (particularly the primary and secondary phosphate esters and mixtures thereof) of the above mentioned nonionic surface active agents as disclosed, for example, in U.S. Pats. 3,004,056 and 3,004,057. Other such anionic surface active agents include alkylsulfonic acids, such as dodecylbenzene sulfonic acid, such as sodium lauryl sulfate, taurines, such as sodium N-methyl taurides of higher ($C_{10}$ to $C_{20}$) fatty acids as disclosed, for example in U.S. Pats. 1,932,180, 3,013,035, 3,013,036 and 3,057,889, isethionates, such as sodium N-methyl isethionate esters of higher ($C_{10}$ to $C_{20}$) fatty acids as disclosed, for example in U.S. Pats. 2,923,724 and 3,004,049.

Protective colloids and thickening agents may also be employed if desired, such as polyvinyl alcohol, copolymers such as the copolymer of vinylmethyl ester and maleic anhydride, hydroxethyl cellulose, carboxymethyl cellulose, natural gums and colloidal materials and the like. Viscosities of up to 80,000 cps. or more may thereby be obtained when required.

It will be apparent to those skilled in the art that the novel principals of the invention disclosed herein, in connection with the specific exemplifications thereof, will suggest various other modifications and applications of the same.

The following examples, which are not to be considered as limiting, illustrate the invention. All parts and proportions referred to herein and in the appended claims are by weight unless otherwise indicated.

EXAMPLE I

An aqueous solution consisting of 0.5 parts of sodium alkylaryl sulfonate emulsifier, 0.3 parts sodium salt of ethylenediamine-tetraacetic acid, 0.5 parts of polyvinyl pyrrolidone (average molecular weight 10,000 K value=15), 0.5 parts fumaric acid, 2.0 parts itaconic acid, and 0.4 parts ammonium persulfate are charged to a polymerization reaction vessel followed by the addition of 0.6 parts of a $C_{12}$ tertiary mercaptan, 61.5 parts of styrene and 36.0 parts of butadiene. The polymerization vessel is heated to a temperature of about 50 to 60° C. and the polymerization allowed to continue to about approximately 100% conversion. The product is a small particle-size emulsion having a solids content of 45.1% expressed as weight of dry solids based on the weight of the latex. Ammonia is thereafter added to the latex until a pH of about 8.5 is reached. The pH, prior to the introduction of ammonia, is about 2 to 4. The latex may then be vacuum stripped to remove unreacted monomer, and water until a solids content of about 53% is reached. Known anti-oxidant and preservatives may then be added. The product yields an air-dried film which is continuous, clear and slightly tacky.

The product of the above polymerization may be compounded into a carpet laminating adhesive which gives an excellent drying rate, wet and dry bonds, blister resistance, good filler wetout, and thickener demand.

EXAMPLE II

The procedure of Example I is repeated with the following changes: there is added 1.0 part sodium dodecylbenzene sulfonate, 1.0 part polyvinyl pyrrolidone (K value=15), 3.0 parts itaconic acid, 0.4 parts tetrasodium ethylenediamine tetraacetic acid, 0.4 parts ammonia persulfate, 0.6 part $C_{12}$ tertiary mercaptan, 49.25 parts of styrene and 47.00 parts of butadiene. The product is a small particle size film forming latex and has the same excellent properties as the latex of Example I. Upon analysis the solids content is found to be 47.8%.

EXAMPLE III

The procedure of Example II is repeated with the same constituents, except that the amount of styrene is decreased to 44.25 parts while 5.00 parts of acrylonitrile is added with the butadiene-styrene mixture. An excellent product having the desired properties is again obtained. Upon analysis the solids content is found to be 48.3%.

EXAMPLE IV

The procedure of Example II is repeated except that the monomer composition is changed as follows: 30.8 parts of styrene, 50.0 parts of butadiene, 16.7 parts of vinylidene chloride are all added together subsequent to the addition of 0.5 parts of fumaric acid and 2.0 parts of itaconic acid. The excellent desired properties are obtained and in addition, the product when used as a carpet adhesive has fire-retardant properties (Methenamine Pill, D.O.C.F.F. 1–70 and Underwriters Chamber Test). Upon analysis the solids content is found to be 52.2%.

EXAMPLE V

The procedure of Example II is repeated except that the amount of styrene is decreased to 44.25 parts and 5.0 parts of methyl methacrylate is added together with the styrene-butadiene mixture. An excellent product having the desired properties is again obtained. Upon analysis the solids content is 48.2%.

EXAMPLE VI

The procedure of Example II is repeated except that the amount of butadiene is decreased to 42.00 parts and 5.0 parts of isoprene is added together with the styrene-butadiene mixture. The product has excellent properties. Upon analysis the solids content is found to be 47.9%.

EXAMPLE VII

The procedure of Example II is repeated except that there is initially added to the water soluble phase 5.0 parts t-butyl-hydroperoxide in place of the ammonium persulfate, together therewith there is added 0.5 parts of sodium metabisulfite and 10 p.p.m. ferric nitrate (Fe+++) to give a Redox catalyst system. The latter being a water insoluble hydroperoxide. The same good results are obtained. Upon analysis the solids content is found to be 47.5%.

EXAMPLE VIII

The procedure of Example II is repeated, except that 5.0 parts azobis (isobutyronitrile) is initially added to the water soluble phase as the catalyst in place of the 0.5 parts ammonium persulfate, the former being an oxygen free water insoluble catalyst. A satisfactory latex is obtained. Upon analysis the solids content is found to be 47.6%.

EXAMPLE IX

The procedure of Example I is repeated with the following changes: there is added 47.5 parts styrene, 50.0 butadiene, 2.5 parts itaconic acid, 0.5 part sodium dodecylbenzene sulfonate, 0.5 part polyvinyl pyrrolidone (K value=15), 0.3 part electrolyte consisting of tetra sodium salt of ethylene diaminetetraacidic acid, 0.4 part ammonium persulfate and 0.6 part tertiary dodecyl mercaptan. The same good results are obtained. Upon analysis the solids content is found to be 46.2%.

EXAMPLE X

The procedure of Example I is repeated, except that polyvinyl pyrrolidone having a K value of 15 is replaced by a polyvinyl pyrrolidone dimer, and the amount of styrene is decreased to 50.0 parts while the amount of butadiene is increased to 47.5 parts. The latex is not as satisfactory as that of Example I. Upon analysis the solids content is found to be 52.4%, the particle size will be higher than that of Example I, thereby indicating poorer micelle formation.

EXAMPLE XI

The procedure of Example I is repeated, except that a polyvinyl pyrrolidone having a K value of 60 is substituted for the polyvinyl pyrrolidone of Example I. The latex obtained is not as satisfactory as that of Example I due to the inability to be concentrated to high solids. Upon analysis the solids content is found to be 48.2%.

EXAMPLE XII

The procedure of Example I is repeated, except that the latex is modified by the post addition of polyvinyl pyrrolidone (K value=15) three hours subsequent to the start of the polymerization reaction. The amount of styrene is also decreased to 58.0 parts while the amount of butadiene is increased to 39.0 parts and no fumaric acid is added but rather only 3.0 parts of itaconic acid. The heretofore good results are not obtained when the polyvinyl pyrrolidone is post added. The solids content is found upon analysis to be 48.4%.

EXAMPLE XIII

The procedure of Example I is repeated, except that the composition of the monomers is changed as follows: 58.0 parts of styrene, 39.0 parts butadiene and 3.0 parts of itaconic acid, there is added no fumaric acid. In this example a K value of 15 is reverted to and the PVP is initially charged. The same good results are obtained. Upon analysis the solids content is found to be 48.0%.

EXAMPLE XIV

The procedure of Example II is repeated, except that a polyvinyl pyrrolidone (K value=30) is substituted for that having the K value of 15. The latex obtained is not as satisfactory as that of Example I due to inability to be concentrated at high solids. Upon analysis the solids content is found to be 48.5%.

EXAMPLE XV

In this example, 4.0 parts of polyvinyl pyrrolidone having a K value of 15 is added, the remaining composition being the same as in Example I. A somewhat less desirable product is obtained than that of Example I. Upon analysis the solids content is found to be 48.1%. The foregoing illustrates that an increase in the amount of polyvinyl pyrrolidone added causes a rapid rate of polymerization and an increase in the amount of coagulum.

EXAMPLE XVI

The procedure of Example I is repeated. To the water soluble phase there is added 38.0 parts of styrene together with 60.0 parts of isoprene which is substituted for the butadiene, 2.0 parts of fumaric acid had earlier been added to the water soluble phase together with 0.25 part polyvinyl pyrrolidone having a K value of 30, 0.9 part additional surfactant and 0.7 part of ammonium lauryl sulfate. The latex obtained is not as satisfactory as that of Example I. Upon analysis the solids content is found to be 48.3%.

EXAMPLE XVII

The procedure of Example I is repeated, except that herein 50.0 parts of butadiene are added with 47.5 parts vinylidene chloride which is substituted for the styrene, both being added to the water insoluble phase. There had earlier been added to the water soluble phase 2.0 parts of itaconic acid and 0.5 part of fumaric acid, 1.0 part polyvinyl pyrrolidone (K value=15) and 1.0 part sodium dodecylbenzene sulfate, 0.3 part of tetra-sodium salt of ethylene diaminetetraacetic acid, 0.4 part of ammonium persulfate and 0.6 part of tertiary-dodecyl mercaptan. The same good results are obtained. Upon analysis the solids content is found to be 52.3%.

EXAMPLE XVIII

The procedure of Example XI is repeated, except that the composition is changed as follows: 17.5 parts of styrene, 50.0 parts butadiene, 30.0 parts vinylidene chloride which monomers are all added to the water insoluble phase. The same good results are obtained. Upon analysis, the solids content is found to be 52.3%.

EXAMPLE XIX

The procedure of Example I is repeated, except that the K value of polyvinyl pyrrolidone is increased to 90. A much less desirable latex is obtained. Upon analysis the solids content is found to be 48%, thereby indicating inability to be concentrated to high solids and a very viscous product.

In each of the foregoing examples the pressure is about 40 to 90 p.s.i. and the temperature about 50° C. to 125° C., preferably about 60° C. to 80° C.

EXAMPLES XX–XXVII

Eight latexes were prepared to demonstrate the effects of polyvinylpyrrolidone (PVP) in such a latex and to show the characteristics of a PVP based latex in a carpet adhesive compound.

EXAMPLE XX

A latex having the following composition, is prepared in accordance with the procedure of Example 1, 1.0 part sodium dodecylbenzene sulfonate, 1.0 part PVP (K value 15), 2.0 parts itaconic acid, 0.5 parts fumaric acid, 0.4 part tetrasodium ethylenediaminetetraacetic acid 0.9 part C–12 tertiary mercaptan, 50.0 parts styrene and 47.5 parts butadiene. Water is added to adjust to a calculated solids content of 46%. The resulting latex, designated "A," has a solids weight content of 45.1%. The latex is coagulum free and has a small particle size as shown by a turbidity measurement employing a spectrophotometer. The latex is adjusted to a pH of 8.5 with ammonia, steam stripped and concentrated to 52.4% weight solids.

EXAMPLE XXI

The procedure of Example XX is repeated with a substitution of an equal weight of a PVP, K 30 for that of K 15. The resulting latex designated "B," has a pH of 3.4, and a 44.8% solids weight content. The latex is adjusted to a pH of 8.5 with ammonia, steam stripped and concentrated to 52.1% weight solids.

EXAMPLE XXII

The procedure of Example XX is repeated with a substitution of PVP, K 60 for the PVP, K 15. The resulting latex designated "C," finishes at 45.3% weight solids and has a pH of 3.5. The latex is adjusted to a pH of 8.5, steam stripped and concentrated to 53.1% weight solids content.

EXAMPLE XXIII

The procedure of Example XX is repeated with a substitution of PVP, K 90, for the PVP, K 15. The resulting latex, designated "D" is a thick semi-solid paste.

EXAMPLE XXIV

The procedure of Example XX is repeated except that the PVP is omitted and an equal weight of additional sodium dodecylbenzene sulfonate is substituted in its place. The resulting latex, designated "E," is coagulum free, has a pH of 3.4 and a total solids weight content of 45.2%. The pH is thereafter adjusted to 8.5 with ammonia, the latex steam stripped and concentrated to 50.5% weight solids content.

EXAMPLE XXV

The procedure of Example XXIV is repeated with the omission of both the PVP and one part sodium dodecylbenzene sulfonate. The resulting latex "F" has heavy coagulum and an extremely large particle size. Latexes "F" and "E" illustrate the function of PVP as part of the surfactant system. From Table 1 below, it can be seen that PVP is probably required in the system in order to give a stable coagulum free small particle size latex (i.e., Latexes A, B and C). Where PVP is omitted (Latex F) and no additional surfactant substituted therefor, heavy coagulum and a large particle size latex is obtained. It is assumed that in Example XXVI, PVP should be replaced with an equal weight of surfactant (sodium dodecylbenzene sulfonate, Latex E) in order to obtain a stable coagulum free small particle size latex. It therefore appears from the particle size data that PVP takes part in and/or aids in micelle formation and that PVP is as effective as other surfactants, i.e., sodium dodecylbenzene sulfonate, in latex stabilization.

EXAMPLE XXVI

The procedure of Example XX is repeated except PVP is replaced with polyvinyl alcohol. The latex designed "G," has heavy coagulum and large particle size.

EXAMPLE XXVII

The procedure of Example XX is repeated except that PVP is replaced with hydroxyethyl cellulose. The resulting latex designated "H," has heavy coagulum and large particle size. Latexes G and H show that PVP has a unique characteristic in functioning as part of the surfactant system.

TABLE I

| Latex | Variation | Particle size | Coagulum |
|---|---|---|---|
| A | PVP K–15 | Small | None. |
| B | PVP K–30 | do | Do. |
| C | PVP K–60 | Medium | Do. |
| D | PVP K–90 | | Solid paste. |
| E | No PVP, 2.0 parts sodium dodecylbenzene sulfonate. | Small | None. |
| F | No PVP, 1.0 part sodium dodecylbenzene sulfonate. | Large | Heavy. |
| G | Polyvinyl alcohol | do | Do. |
| H | Hydroxyethyl cellulose | do | Do. |

To show the excellent characteristics of Latexes A, B, C and E as carpet laminating adhesive compositions, each latex is used to prepare a carpet adhesive composition as follows:

|   | Parts |
|---|---|
| Latex | 100 |
| #10 Whiting | 350 |
| "WICA" 6087 (a sodium salt of polyacrylic acid) | 3–7 |

The carpet coating compositions have a total solids content of 72% and are adjusted to a viscosity of 10,000 cps. Latexes A, B and C have satisfactory filler wet out, however, it is necessary to add 0.5 part TSPP to obtain satisfactory filler wet out with Latex E. The viscosity of the compositions are checked at 24, 48 and 72 hours. All have satisfactory viscosity stability.

The compositions are coated on 4 x 4 inch pieces of tufted nylon carpet, placed in a small split zone oven (coated side to heat) to dry and examined for the formation of blisters. The PVP based latexes have few or no blisters (K–15 being best) while the compositions with Latex E are covered with numerous blisters. It is desirable that carpet coating compositions do not form blisters that will show through the face or back of a carpet. PVP has a characteristic of suppressing blister formation.

The compositions are coated on 6 x 12 inch nylon tufted carpet (27 oz./sq yd.) and a jute back applied. The coated samples are placed in an oven at 135° C. and the period of time for all the moisture to evaporate as determined by a moisture meter. The results are as follows:

TABLE II

|  | Minutes |
|---|---|
| Latex A | 10.5 |
| Latex B | 10.8 |
| Latex C | 10.7 |
| Latex E | 12.1 |

The latex is suitable for a wide variety of uses in the art. It is unusually stable to intense mechanical shear, freeze-thaw cycling and the addition of electrolytes such as mineral acids, polyvalent methyl salts and the like. It is compatible with many other commercial latices and tolerates well pigment and filler loading. It can be used in a wide variety of adhesive applications in addition to its use as a tire cord dip, particularly for laminating similar or dissimilar materials together, such as for bonding synthetic plastics to fabrics of natural or synthetic origins such as the application of polyurethane to fabrics, and other adhesives sizing and curing applications, and particularly with paper, leather and textiles. More particularly, it may be used as an adhesive for laminating jute to carpet backing. These novel latices, either alone or compounded with other resins, or latices, form films which set up rapidly and adhere to a number of polar and non-polar surfaces. In wet bonding of porous surfaces, penetration is uniform so that film thickness on the surface can be readily controlled. Requirements for a wide variety of coatings and special purpose adhesives are readily met by compounding with plasticizers, borates, solvents, pigments and thickeners, or other modifying resins or latices. Among the types of surfaces on which they can be used either as coatings or as adhesives, between two similar or dissimilar surfaces are paper, glass, natural and synthetic fibers, wood, aluminum foil, steel and leather. In paper applications these novel latices are used as a pigment binder for Georgia clay, $TiO_2$ and $CaCO_3$. Where applied to porous materials, they impart improved oil and grease resistance, light stability and improved dyeability and printing and have good adhesion to paper and a variety of natural and synthetic fibers. The films from these novel latices have good affinity for vat, sulfur, acid, disperse and direct dyes and their application as a surface coating or sizing to a variety of fabrics, particularly synthetic fibers, and films, improves the dyeability thereof, and impart antistatic properties. The films produced from the novel latices of the present invention can be applied and cured by heating in order to effect cross-linking. Various curing aids can be used in this case, such as free radical sources, e.g., ammonium persulfate or small amounts of dibasic acids such as 1% or less of succinic acid.

The novel latices of the present invention have been found to be compatible with such commercial latices as those of butadiene-acrylonitrile latices, polyvinyl acetate copolymers, styrene-butadiene emulsions, vinyl acetate, vinyl stearate copolymer styrene emulsions, alkyd and acrylate emulsions or latices, and for such natural occurring products as dextrine or starch. In the latter application, the novel latices of the present invention may be used in starch or dextrine adhesive compositions. It is also compatible with other latices obtained by polymerization of vinyl monomers, such as styrene, or acrylic ester with the polyvinyl pyrrolidone, such as those described in U.S. Pats. 3,244,657 and 3,244,658.

Other variations and modifications of this invention will be obvious to those skilled in the art and can be made in the invention without departing from the scope of intent thereof.

Having thus described our invention, what we claim as new and desire to secure by Letters Patent is:

1. A latex prepared by emulsion co-polymerization in an aqueous acidic medium containing an anionic, cationic, or nonionic surfactant and a mixture of monomers comprising approximately by weight 87 to 27 parts of an open chain conjugated diene, 12 to 70 parts of a monoalkenyl aromatic monomer, and 0.5 to 10 parts of at least one olefinically unsaturated aliphatic carboxylic acid in the presence of a free radical supplying catalyst and as co-surfactant 0.5 to 5% of a poly (N-vinyl lactam) having a Fikentscher K-value of about 14 to 30.

2. A latex as defined in claim wherein said open chain conjugated diene is selected from the group consisting of 1,3 butadiene and 2-methyl-1,3-butadiene.

3. A latex as defined in claim 1 wherein said monoalkenyl aromatic monomer is styrene.

4. A latex as defined in claim 1 wherein said olefinically unsaturated carboxylic acid is a mono-carboxylic acid.

5. A latex as defined in claim 1 wherein said olefinically unsaturated carboxylic acid is a poly-carboxylic acid.

6. A latex as defined in claim 5 wherein said polycarboxylic acid is fumaric acid or itaconic acid or a mixture thereof.

7. A latex as defined in claim 1 in which said mixture of monomers also contains a non-carboxylated monoalkenyl aliphatic monomer.

8. A latex as defined in claim 7 wherein said non-carboxylated mono-alkenyl aliphatic monomer is selected from the group consisting of vinylidene chloride, acrylonitrile and methyl methacrylate.

9. A latex as defined in claim 7 wherein said mixture of monomers contains, approximately by weight 0 to 17 parts of a noncarboxylated monoalkenyl aliphatic monomer.

10. A latex as defined in claim 1 wherein said poly (N-vinyl lactam) is polyvinyl pyrrolidone.

References Cited

UNITED STATES PATENTS

| 3,407,164 | 10/1968 | Schmidt | 260—29.7 H |
| 2,394,406 | 2/1946 | Schoenfeld | 260—80.7 |
| 3,344,103 | 9/1967 | Eilbeck et al. | 260—29.7 T |
| 3,352,808 | 11/1967 | Leibowitz et al. | 260—41.5 R |
| 3,409,569 | 11/1968 | Lane et al. | 260—29.7 T |
| 3,594,336 | 7/1971 | Burgmeister et al. | 260—17 R |
| 3,637,567 | 1/1972 | Fein et al. | 260—29.7 T |

FOREIGN PATENTS

| 1,021,121 | 2/1966 | Great Britain | 260—88.3 R |

OTHER REFERENCES

Izumi et al.: J. Pol. Sci. Part A–1, vol. 5, pp. 455–468 (1967).

Chem. Abs. 66: P66221s.

Schwartz et al.: Surface Active Agents and Detergents (vol. 2) (Interscience) (New York) (1958), pp. 306–307.

MORRIS LIEBMAN, Primary Examiner

H. H. FLETCHER, Assistant Examiner

U.S. Cl. X.R.

260—29.7 T, 29.7 UA, 78.5 R, 80.7, 88.3 R, 88.3 L, 887